United States Patent
Yee et al.

(10) Patent No.: US 10,817,027 B2
(45) Date of Patent: Oct. 27, 2020

(54) WINDOW

(71) Applicant: SAMSUNG DISPLAY CO., LTD., Yongin-si, Gyeonggi-Do (KR)

(72) Inventors: Dong-Su Yee, Cheonan-si (KR); Minhyuk Im, Cheonan-si (KR); Myungan Min, Cheonan-si (KR); Sujin Jung, Seoul (KR)

(73) Assignee: SAMSUNG DISILAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/230,937

(22) Filed: Dec. 21, 2018

(65) Prior Publication Data
US 2019/0204877 A1    Jul. 4, 2019

(30) Foreign Application Priority Data

Jan. 4, 2018    (KR) .................. 10-2018-0001248

(51) Int. Cl.
G06F 1/16    (2006.01)

(52) U.S. Cl.
CPC .......... G06F 1/1656 (2013.01); G06F 1/1626 (2013.01); G06F 1/1637 (2013.01); G06F 1/1684 (2013.01); G06F 1/1686 (2013.01)

(58) Field of Classification Search
None
See application file for complete search history.

(56) References Cited

U.S. PATENT DOCUMENTS

| | | | | |
|---|---|---|---|---|
| 9,063,699 | B1* | 6/2015 | Huang | G06F 1/1643 |
| 9,788,620 | B1* | 10/2017 | Parkinson | A45C 11/00 |
| 10,317,776 | B2* | 6/2019 | Gustaveson, II | H04N 5/2254 |
| 2012/0229700 | A1* | 9/2012 | Hsiung | H04M 1/0264 |
| | | | | 348/371 |
| 2012/0274887 | A1* | 11/2012 | Hwang | G02F 1/13473 |
| | | | | 349/115 |
| 2013/0098549 | A1* | 4/2013 | Drage | B32B 27/40 |
| | | | | 156/308.6 |
| 2013/0176484 | A1* | 7/2013 | Pilliod | G03B 15/05 |
| | | | | 348/373 |
| 2013/0329173 | A1* | 12/2013 | Jung | H04B 1/3838 |
| | | | | 349/122 |

(Continued)

FOREIGN PATENT DOCUMENTS

| | | |
|---|---|---|
| CN | 102874481 | 1/2013 |
| KR | 100730081 | 6/2007 |

(Continued)

*Primary Examiner* — Daniel P Wicklund
*Assistant Examiner* — Christopher L Augustin
(74) *Attorney, Agent, or Firm* — F. Chau & Associates, LLC (57) ABSTRACT

A window includes a window that includes a first hole, a second hole, and a third hole between the first and second holes, a front protection film disposed on a front surface of the window that covers the first, second, and third holes, a first protection film disposed on a rear surface of the window that covers the first hole, a second protection film disposed on the rear surface of the window that covers the second hole, a cover disposed on the rear surface of the window and inserted into the third hole, the cover including a plurality of holes, and a cap disposed on the rear surface of the window and on the first and second protection films and the cover.

21 Claims, 8 Drawing Sheets

(56) References Cited

U.S. PATENT DOCUMENTS

| | | | |
|---|---|---|---|
| 2014/0152890 A1* | 6/2014 | Rayner | G06F 1/1626 348/376 |
| 2015/0036286 A1* | 2/2015 | Lu | G06F 1/1626 361/679.46 |
| 2015/0104609 A1* | 4/2015 | Chiang | G06F 1/1607 428/138 |
| 2016/0209569 A1* | 7/2016 | Cho | G02B 6/006 |
| 2016/0221863 A1* | 8/2016 | Murata | G06F 1/1626 |
| 2016/0338188 A1* | 11/2016 | Dighde | H04M 1/0266 |
| 2017/0068288 A1* | 3/2017 | Uttermann | G06F 1/1635 |
| 2017/0075386 A1* | 3/2017 | Park | G06F 3/0412 |
| 2017/0110684 A1* | 4/2017 | Wang | H01L 27/323 |
| 2017/0127163 A1* | 5/2017 | Weber | B05D 5/04 |
| 2017/0339261 A1* | 11/2017 | Chiang | H04M 1/0266 |
| 2018/0178494 A1* | 6/2018 | Kim | B32B 23/08 |
| 2019/0009498 A1 | 1/2019 | Yee | |

FOREIGN PATENT DOCUMENTS

| | | |
|---|---|---|
| KR | 10-2014-0057462 | 5/2014 |
| KR | 10-2014-0092138 | 7/2014 |
| KR | 10-2019-0006140 | 1/2019 |

\* cited by examiner

WINDOW

CROSS-REFERENCE TO RELATED APPLICATIONS

This U.S. non-provisional patent application claims priority under 35 U.S.C. § 119 from, and the benefit of, Korean Patent Application No. 10-2018-0001248, filed on Jan. 4, 2018 in the Korean Intellectual Property Office, the contents of which are herein incorporated by reference in their entirety.

BACKGROUND OF THE INVENTION

Embodiments of the present disclosure are directed to a window, and in particular, to a window that can prevent contamination materials from entering holes in the window.

In general, a display device includes a display panel that displays an image, a rear surface protection film below the display panel that protects a rear surface of the display panel, and a window on the display panel thin protects a from surface of the display panel. The window may be formed of tempered glass or a transparent plastic material.

A window includes a display region in which an image is displayed on the display panel to a user, and a non-display region that surrounds the display region. A plurality of holes are defined in the non-display region of the window to allow parts of the display panel, such as a sensor, a camera, or a sound device, to be exposed to the outside.

During an assembling process that attaches the window to the display panel, the window is loaded into a chamber. However, in some cases, there may be contaminating materials in the holes of the window, and such contaminating materials can be adsorbed onto the display panel during the assembling process, thereby causing the display panel to fail.

SUMMARY

Some embodiments of the inventive concept can provide a window that prevents contamination materials from entering holes in the window.

According to some embodiments of the inventive concept, a window includes a window that includes a first hole, a second hole, and a third hole between the first and second holes, a from protection film disposed on a front surface of the window that covers the first, second, and third holes, a first protection film disposed on a rear surface of the window that covers the first hole, a second protection film disposed on the rear surface of the window that covers the second hole, a cover disposed on the rear surface of the window and inserted into the third hole, the cover including a plurality of holes, and a cap disposed on the rear surface of the window and on the first and second protection films and the cover.

In some embodiments, the cap include a first cap portion that covers the cover, a second cap portion extending from an end of the first cap portion and that covers the first protection film, and a third cap portion extending, from an opposite end of the first cap portion and that covers the second protection film.

In some embodiments, the cap further includes a first sidewall portion that extends from the end of the first cap portion to an end of the second cap portion that is adjacent to the end of the first cap portion, and a second sidewall portion that extends from the opposite end of the first cap portion to an end of the third portion that is adjacent to the opposite end of the first cap portion. The first and second sidewall portions extend from the first cap portion toward the rear surface of the window in a direction normal to a flat surface of the window.

In some embodiments, the first cap portion is higher with respect to the rear surface of the window than the second and third cap portions, and the second cap portion is disposed coplanar with the third cap portion. The first, second, and third cap portions have the same thickness.

In some embodiments, the window further includes an adhesive member disposed below each of the first, second, and third cap portions. The adhesive member includes a base substrate, a first sub-adhesive portion disposed on the base substrate, and a second sub-adhesive portion disposed below the base substrate. The first sub-adhesive portion is attached to a bottom surface of each of the first, second, and third cap portions, and an adhesive strength of the first sub-adhesive portion is greater than that of the second sub-adhesive portion.

In some embodiments, the cover includes a first cover inserted into the third hole, the holes being provided in the first cover, and a second cover extending from the first cover and disposed on the rear surface of the window adjacent to the third hole.

In some embodiments, the first cover may include a flat first sub-cover, the holes being provided in first sub-cover, and a second sub-cover extending from an end of the first sub-cover that extends in a direction normal to the rear surface of the window, and is disposed on an inner side surface of the third hole. The second cover extends from a top portion of the second sub-cover.

In some embodiments, the window further includes a strengthening portion disposed on a side surface of the second sub-cover and a top surface of the second cover. The first cap portion is disposed on the first sub-cover and the strengthening portion and covers the holes.

In some embodiments, the window includes a display region and a non-display region that surrounds the display region, and the first, second, and third holes may be provided on the non-display region and are spaced apart in first direction.

In some embodiments, the third cap portion includes a first sub-cap portion and a second sub-cap portion spaced apart from each other in the first direction and that extend in a second direction crossing the first direction, and a third sub-cap portion extending from top portions of the first and second sub-cap portions and that extends in the first direction.

In some embodiments, the second hole includes a first sub-hole and a second sub-hole spaced apart in the first direction. The first sub-cap portion overlaps the first sub-hole, and the second sub-cap portion overlaps the second sub-hole.

In some embodiments, the first cap portion extends in the first direction, and a width of the second cap portion is greater than a width of the first cap portion when measured in the second direction.

According to some embodiments of the inventive concept, a window includes a window that includes a first hole, a second hole, and a third hole between the first and second holes, a front protection film disposed on a front surface of the window, a first protection film disposed on a rear surface of the window that covers the first hole, a second protection film disposed on the rear surface of the window that covers the second hole, a cover disposed on the rear surface of the window and inserted into the third hole, the cover including a plurality of holes, a first cap portion disposed on the rear surface of the window and on the cover, a first sidewall portion extending from an end of the first cap portion that extends in a direction normal to a flat surface of the window, and a second sidewall portion extending from an opposite end of the first cap portion and that extends parallel to the second sidewall portion. The first sidewall portion and the second sidewall portion extend from the first cap portion toward the rear surface of the window.

According to some embodiments of the inventive concept, a window includes a window that includes a first hole, a second hole, and a third hole between the first and second holes, a front protection film disposed on a front surface of the window, a first protection film disposed on a rear surface of the window that covers the first hole, a second protection film disposed on the rear surface of the window that covers the second hole, a cover disposed on the rear surface of the window and inserted into the third hole, the cover including a plurality of holes, and a first cap portion disposed on the rear surface of the window and on the cover. The first hole is closed by the front protection film and the first protection film, the second hole is closed by the front protection film and the second protection film, and the holes are closed b the front protection film and the first cap portion.

BRIEF DESCRIPTION OF THE DRAWINGS

It should be noted that the use of similar or identical reference numbers in the various drawings is intended to indicate the presence of a similar or identical element or feature.

DETAILED DESCRIPTION

Exemplary embodiments of the inventive concepts will now be described more fully with reference to the accompanying drawings, in which exemplary embodiments are shown. Exemplary embodiments of the inventive concepts may, however, be embodied in many different forms and should not be construed as being limited to the embodiments set forth herein. In the drawings, the thicknesses of layers and regions ma be exaggerated for clarity. Like reference numerals in the drawings may denote like elements, and thus their description may be omitted.

Figure 1:
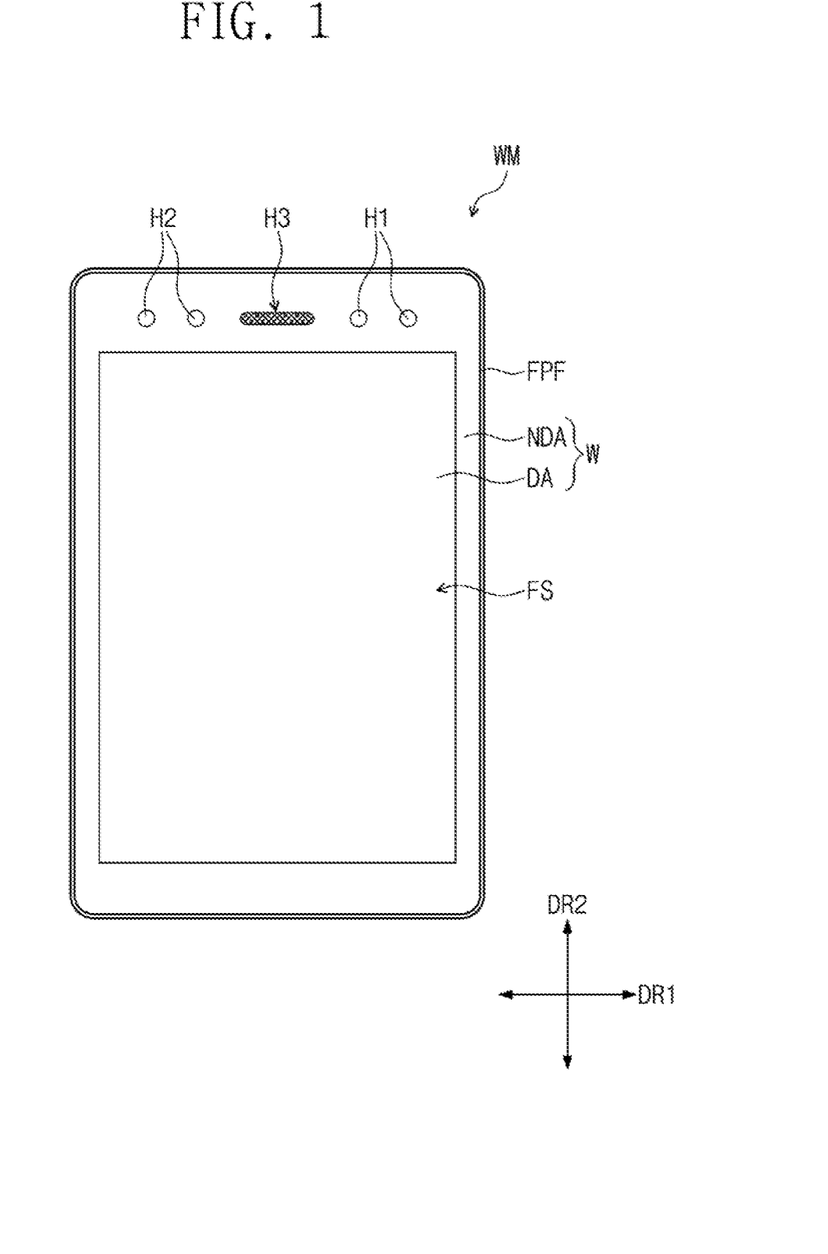
FIG. 1 is a plan view of a front surface of a window according to some embodiments of the inventive concept.

It will be understood that when an element is referred to as being "connected" or "coupled" to another element, it can be directly connected or coupled to the other element or intervening elements may be present. FIG. 1 is a plan view of a front surface of a window according to some embodiments of the inventive concept.

Referring to FIG. 1, a window WM according to some embodiments of the inventive concept has a rectangular shape whose short sides are parallel to a first direction DR1 and whose long sides are parallel to a second direction DR2 that crosses the first direction DR1. The window WM also has rounded corners.

According to some embodiments, the window WM includes a window W and a front protection film FPF on a front surface FS of the window W. Similar to the window WM, the window W has a rectangular shape whose short sides are parallel to the first direction DR1, whose long sides are parallel to the second direction DR2, and whose corners are rounded. The window W may be formed of tempered glass or a transparent plastic material. The front protection film FPF is a thin plastic protection film.

According to some embodiments, the window W may be formed of or include at least one of various plastic materials, such as polyethyleneterephthalate (PET), polyethersulfone (PES), polyethylenenaphthalate (PEN), polyarylate (PAR), polycarbonate (PC), polyimide (PI), or polyamide (PA).

According to some embodiments, the window W is attached to a front surface of a display panel that is used to display an image and protects the display panel from external scratches and impacts. The window W includes a display region DA in which an image can be displayed to a user, and a non-display region NDA that surrounds the display region DA. The non-display region NDA can prevent light from passing therethrough and, in some embodiments is printed with a specific color to form an edge region of the window WM.

According to some embodiments, a plurality of holes H1, H2, and H3 are arranged in the first direction DR1 in the non-display region NDA of the window W. For example, the holes H1, H2, and H3 are provided in a region of the non-display region NDA that is adjacent to one of the short sides of the window W. The holes H1, H2, and H3 are formed by removing predetermined portions of the non-display region NDA of the window W.

According to some embodiments, various components, such as sensors, cameras, or sound devices, can be provided in the display panel. When a window W is provided on the display panel, the sensors, the cameras, and the sound devices are exposed to the outside through the holes H1, H2, and H3.

According to some embodiments, the holes H1, H2, and H3 include a plurality of first holes H1, a plurality of second holes H2, and a third hole H3 between the first and second holes H1 and H2. The sensors and the camera are exposed to the outside through the first and second holes H1 and H2, and a speaker of a sound device is exposed to the outside through the third hole H3. The first and second holes H1 and 142 can be sensor and camera holes, and the third hole 113 can be a speaker hole.

FIG. 1 illustrates an example in which there is a plurality of first holes H1 and a plurality of second holes H2, but embodiments of the inventive concept are not limited thereto. For example, there may be one first hole H1 and one second hole H2 in the window W. In this case, one sensor and one camera are exposed to the outside through the first hole H1 and the second hole H2, respectively.

According to some embodiments, the front protection film FPF is disposed on the front surface FS of the window W to cover the first, second, and third holes H1, H2, and H3. The first, second, and third holes H1, H2, and H3 are closed by the front protection film FPF on the front surface FS of the window W.

Figure 2:
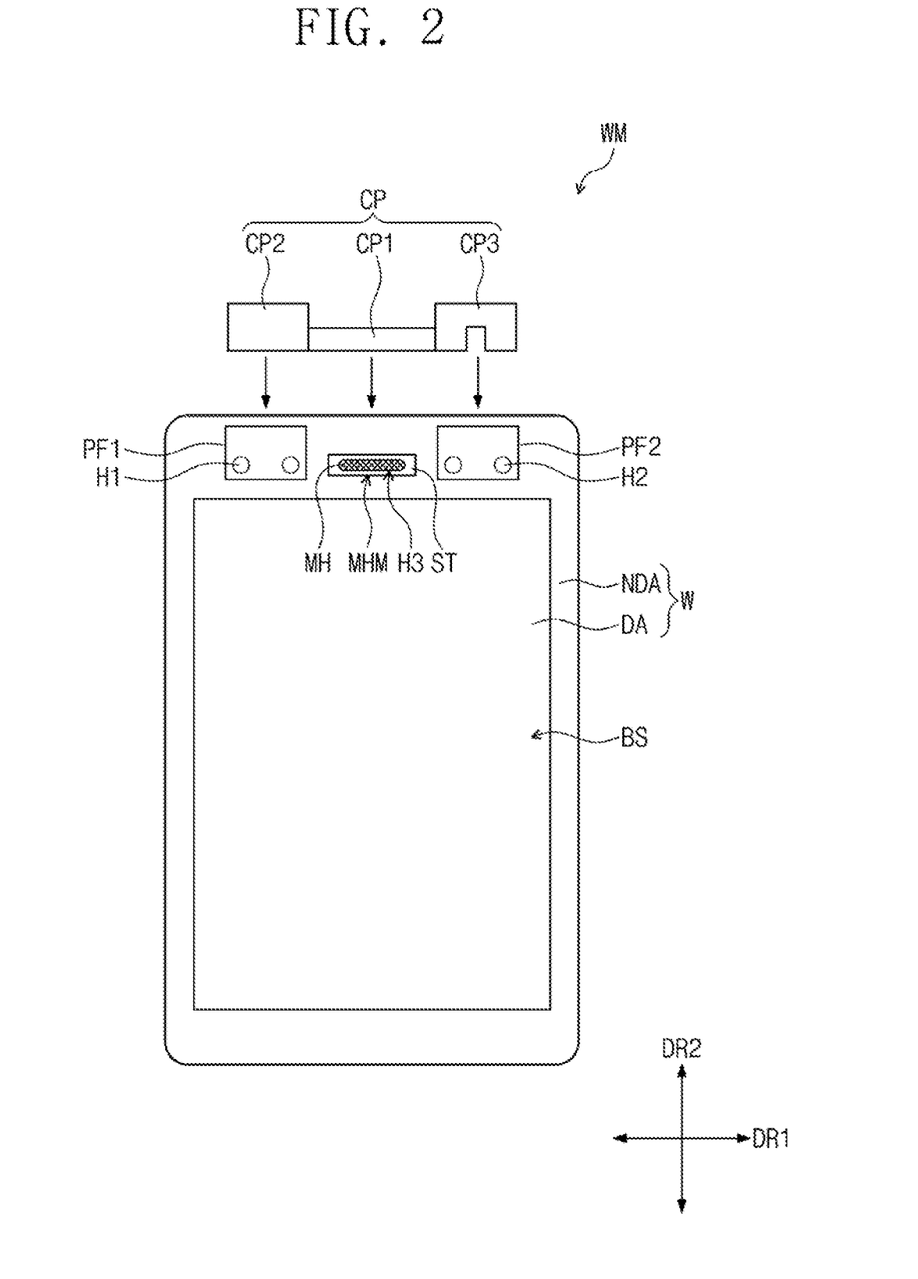
FIG. 2 is a plan view of a rear surface of a window according to some embodiments of the inventive concept.

FIG. 2 is a plan view of a rear surface of a window according to some embodiments of the inventive concept.

Referring to FIG. 2, according to some embodiments, the window WM includes a first protection film PF1, a second protection film PF2, a cap CP, a cover MHM, and a strengthening portion ST. The first protection film PF1, the second protection film PF2, the cap CP, the cover MHM, and the strengthening portion ST are disposed on a rear surface BS of the window W. For convenience of illustration, the cap CP is illustrated in FIG. 2 as being separated from the window W. The arrangement of the cap CF on the rear surface BS of the window W will be described in more detail with reference to FIG. 5.

According to some embodiments, the first and second protection films PF1 and PF2 are disposed in the non-display region NDA of the rear surface BS of the window W. The first protection film PH is disposed on the rear surface BS of the window W to cover the first holes H1 and the second protection film PF2 is disposed on the rear surface BS of the window W to cover the second holes H2.

According to some embodiments, a plurality of holes MH are provided, in the cover MHM, and the cover MEM are inserted into the third hole H3. A speaker is substantially exposed to the outside through the holes MH. The cover MHM is formed of stainless steel. The strengthening portion ST is disposed on the cover MHM. Detailed structures of the strengthening and covers ST and MHM will be described in more detail with reference to FIG. 6.

According to some embodiments, the cap CP is disposed on the first and second protection films PF1 and PF2 to fix the first and second protection films PF1 and PF2. The cap CP is disposed on the cover MHM and the strengthening portion ST to cover the holes MH, thereby closing the holes MH. The cap CP is formed by a plastic injection process.

According to some embodiments, the cap CP includes a first cap portion CP1 that extends in the first direction DR1, a second cap portion CP2 extending from an end of the first cap portion CP1 and a third cap portion CP3 extending from an opposite end of the first cap portion CP1. The first cap portion CP1 the second cap portion CP2, and the third cap portion CP3 are spaced apart in the first direction DR1.

According to some embodiments, the first cap portion CP1 is disposed on the cover MHM and the strengthening portion ST to cover the holes MH. The second cap portion CP2 is disposed on the first protection film PF1, and the third cap portion CP3 is disposed on the second protection film PF2. When measured in the second direction DR2, a width of the second cap portion CP2 is greater than a width of the first cap portion CP1.

Figure 3:
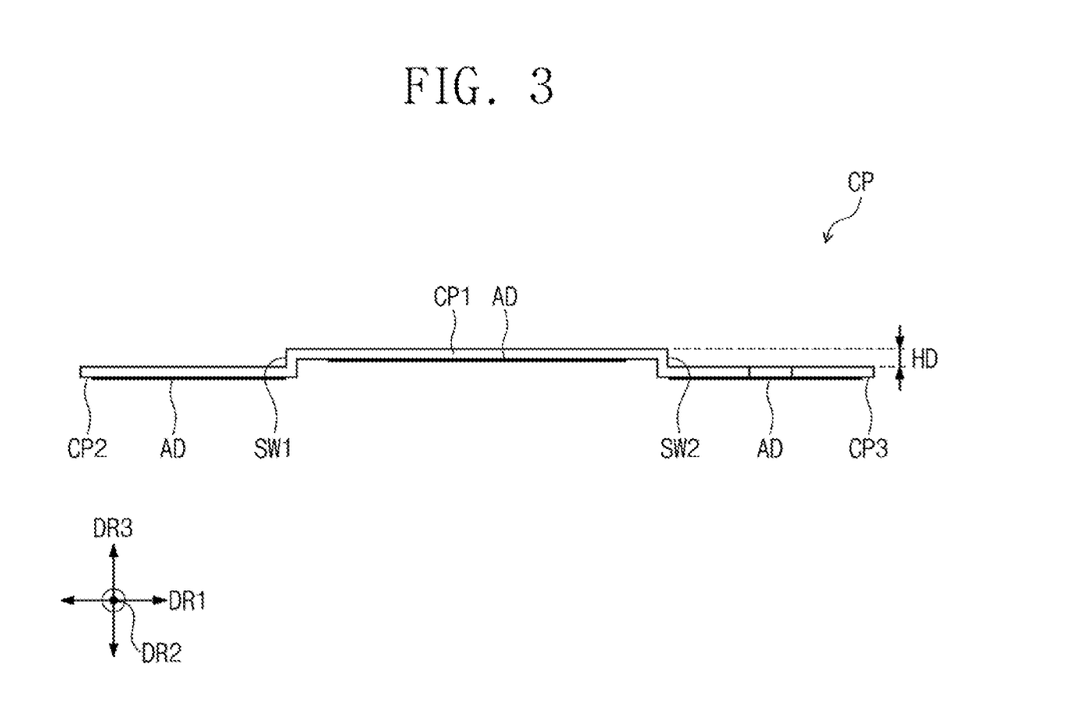
FIG. 3 is a side view of a cap of FIG. 2.
Figure 4:
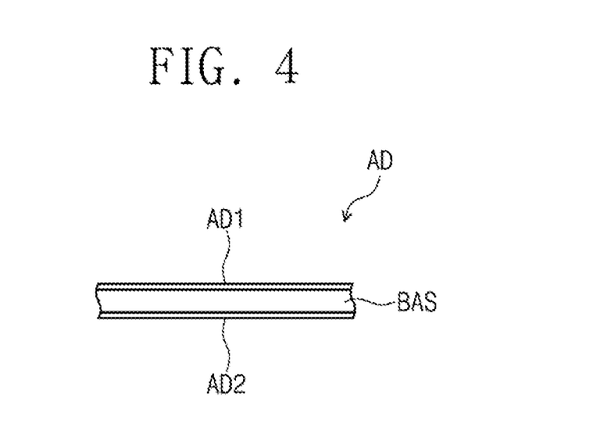
FIG. 4 is a sectional view of an adhesive member of FIG. 3.

FIG. 3 is a side view of a cap of FIG. 2. FIG. 4 is a sectional view of an adhesive member of FIG. 3.

For convenience of illustration, an enlarged view of a portion of the cap CP is illustrated in FIG. 3, and an enlarged view of a portion of an adhesive member AD is illustrated in FIG. 4.

Referring to FIG. 3, according to some embodiments, the cap CP includes a first sidewall portion SW1 and a second sidewall portion SW2 that extends from two opposite ends of the first cap portion CP1. The window W has flat top and bottom surfaces that are parallel to the first and second directions DR1 and DR2, and hereinafter, a third direction DR3 is used to indicate a direction that is not parallel to the flat surface of the window W. The third direction DR3 is substantially normal to the flat surface of the window W. The first sidewall portion SW1 and the second sidewall portion SW2 are parallel to each other and extend in the third direction DR3 or toward the rear surface HS of the window W.

According to some embodiments, the first sidewall portion SW1 extends from an end of the first cap portion CP1 to an end of the second cap portion CP2, which is adjacent to the end of the first cap portion CP1 The second sidewall portion SW2 extends from an opposite end of the first cap portion CP1 to an opposite end of the third cap portion CP3, which is adjacent to the opposite end of the first cap portion CP1.

According to some embodiments, the first cap portion CP1 is higher than the second and third cap portions CP2 and CP3, and the second cap portion CP2 is disposed coplanar with the third cap portion CP3. The first, second, and third cap portions CP1, CP2, and CP3 have the same thickness in the third direction DR3.

According to some embodiments, a thickness of each of the first, second, and third cap portions CP1, CP2, and CP3, which is measured in the third direction DR3, is defined as a distance between top and bottom surfaces of each of the first, second, and third cap portions CP1, CP2, and CP3. A height difference HD between the top surface of the first cap portion CP1 and the top surface of each, of the second and third cap portions CP2 and CP3 ranges from about 0.45 mm to about 0.6 mm.

According to some embodiments the adhesive member AD is disposed below each of the first, second, and third cap portions CP1, CP2, and CP3, The adhesive member AD is a double-sided adhesive member. As shown in FIG. 4, the adhesive member AD includes a base substrate BAS, a first sub-adhesive portion AD1 disposed on a top surface of the base substrate BAS, and a second sub-adhesive portion. AD2 disposed on a bottom surface of the base substrate BAS.

According to some embodiments, the first sub-adhesive portion AD1 is attached, to a bottom surface of each of the first, second, and third cap portions CP1, CP2, and CP3. An adhesive strength of the first sub-adhesive portion AD1 is greater than that of the second sub-adhesive portion AD2, as will be described in more detail with reference to FIG. 6.

Figure 5:
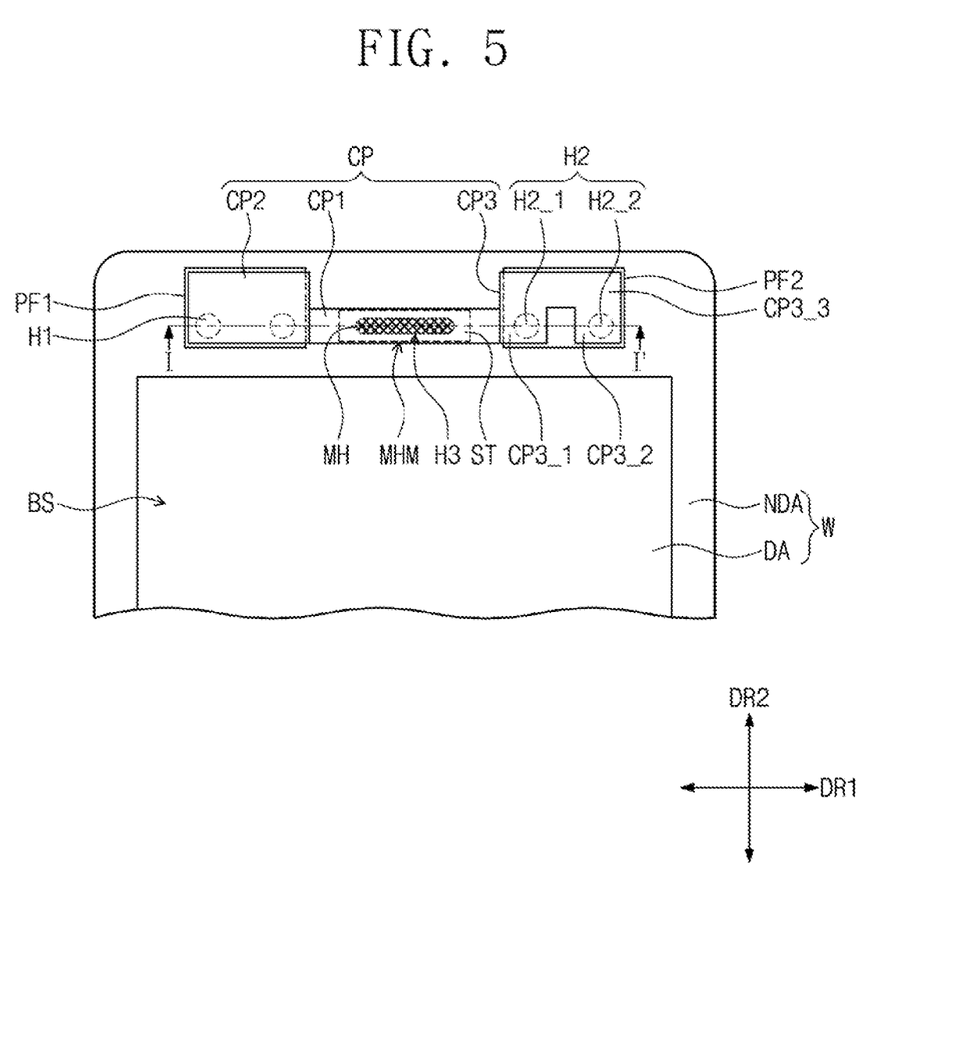
FIG. 5 is an enlarged plan view of a cap of FIG. 2 provided on a rear surface of a window.
Figure 6:
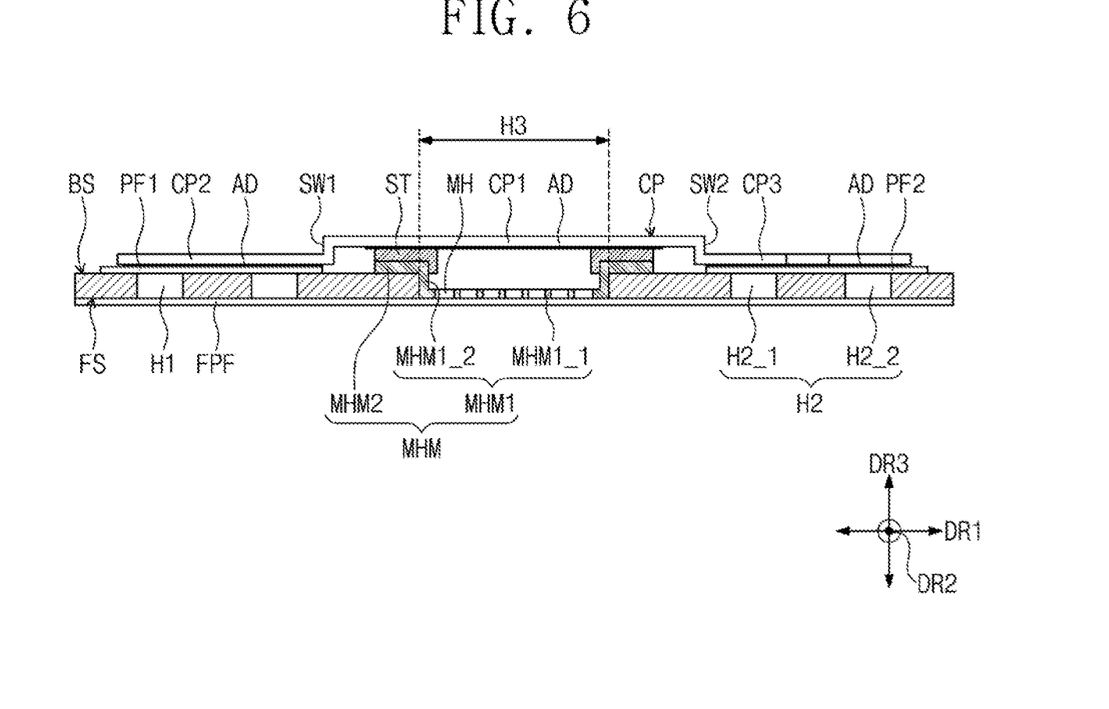
FIG. 6 is a sectional view taken along line I-I' of FIG. 5.

FIG. 5 is an enlarged plan view of a cap of FIG. 2 that is disposed on a rear surface of a window. FIG. 6 is a sectional view taken along line I-I' of FIG. 5.

Referring to FIGS. 5 and 6, according to some embodiments, the cover MHM includes a first cover MHM1 in which the holes MH are defined, and a second cover MHM2 that extends from the first cover MHM1. The first cover MHM1 is inserted into the third hole H3, and the second cover MHM2 is disposed on a portion of the rear surface BS of the window W adjacent to the third hole H3.

According to some embodiments, the first cover MHM1 includes a first sub-cover MHM1_1 which the holes MH are defined, and a second sub-cover MHM1_2 that extends from the first sub-cover MHM1_1. The first sub-cover MHM1_1 has a flat shape and is positioned at a bottom of the third hole H3.

According to some embodiments, the second sub-cover MHM1_2 extends from an end of the first sub-cover MHM1_1 and extends in the third direction DR3. The second sub-cover MHM1_2 is disposed on an inner side surface of the third hole H3, and the second cover MHM2 extends from a top portion of the second sub-cover MHM1_2.

According to some embodiments, the strengthening portion ST is disposed on the second cover MHM2 and extends to cover a top surface of the second sub-cover MHM1_2 as well as an upper portion of a side surface of the second sub-cover MHM1_2. The side surface of the second sub-cover MHM1_2 is disposed on an inner side surface of the third hole 113. The strengthening portion ST is formed of stainless steel and reinforces the cover MHM.

According to some embodiments, the first cap portion CP1 is disposed on the first sub-cover MHM1_1 and the strengthening portion ST to cover or close the holes MH.

The first cap portion CP1 is attached to a top surface of the strengthening portion ST by the adhesive member AD below the first cap portion CP1.

According to some embodiments, the second cap portion CP2 is disposed on the first protection film PF1, and the third cap portion CP3 is disposed on the second protection film PF2. The second and third cap portions CP2 and CD3 are respectively attached to the first and second protection films PF1 and PF2 by the adhesive members AD below the second and third cap portions CP2 and CP3, respectively.

In some cases, positions of the first and second protection films PF1 and PF2 on the rear surface BS of the window W can be changed by an external force. According to some embodiments of the inventive concept, the second and third cap portions CP2 and CP3 are disposed on the first and second protection films PF1 and PF2 to more tightly fix the first and second protection films PF1 and PF2. Accordingly, the first and second protection films PF1 and PF2 can be prevented from being deformed or warped.

The cap CP can be misaligned and become attached to a position outside a normal region. In this case, it may be necessary to detach the cap CP from the misaligned position. According to some embodiments, the first sub-adhesive portions AD1 of the adhesive members AD are attached to bottom surfaces of the first, second, and third cap portions CP1, CP2, and CP3, and the second sub-adhesive portions AD2 are attached to top surfaces of the first and second protection films PF1 and PF2 and a lop surface of the strengthening portion ST.

According to some embodiments, when an adhesive strength of the second sub-adhesive portion AD2 is greater than that of the first sub-adhesive portion AD1, if the cap CP detaches, the adhesive members AD detach from the first, second, and third cap portions CP1, CP2, and CP3 while being attached to the top surfaces of the first and second protection films PF1 and PF2 and the strengthening portion ST.

In some embodiments, an adhesive strength of the first sub-adhesive portion AD1 is greater than that of the second sub-adhesive portion AD2. Thus, even when the cap CP detaches from the first and second protection films PF1 and PF2 and the strengthening portion ST, the adhesive members AD does not detach from the first, second, and third cap portions CP1, CP2, and CP3.

According to some embodiments, the third cap portion CP3 includes a first sub-cap portion CP3_1, a second sub-cap portion CP3_2, and a third sub-cap portion CP3_3. The first sub-cap portion CP3_1 and the second sub-cap portion CP3_2 are spaced apart from each other in the first direction DR1 and extend in the second direction DR2. The third sub-cap portion CP3_3 extends in the first direction DR1 and extends from top portions of the first and second sub-cap portions CP3_1 and CP3_2.

According to some embodiments, the second holes H2 include a first sub-hole H2_1 and a second sub-hole H2_2 that are spaced apart in the first direction DR1. The first sub-cap portion CP3_1 overlaps the first sub-hole H2_1, and the second sub-cap portion CP3_2 overlaps the second sub-hole H2_2. The third cap portion CP3 is not provided between the first sub-hole H2_1 and the second sub-hole H2_2.

According to some embodiments, a QR code can be provided between the first sub-hole H2_1 and the second sub-hole H2_2 of the window W. The QR code provides detail information of the window W, such as, about a manufacturer, a manufactured date, or a size of the window W. The detail information on the window W can be obtained by scanning the QR code in a process of fabricating a display device. Since the third cap portion CP3 is Trot provided between the first sub-hole H2_1 and the second sub-hole H2_2 the QR code is not obscured by the third cap portion CP3, and thus, it is possible to normally scan the QR code.

According to some embodiments, a process of fabricating a display device includes assembling the window WM with the display panel. The window WM is moved toward the display panel to assemble the window WM while maintaining the front protection film FPF, the first and second protection films PF1 and PF2, and the cap CP that are attached to the window W. The first, second, and third holes H1, H2, and H3 are closed by the front protection film FPF on the front surface FS of the window W, and the first and second holes H1 and H2 are closed by the first and second protection films PF1 and PF2 on the rear surface BS of the window W.

According to some embodiments, the third hole H3 is substantially closed by the first cap portion CP1 disposed on the rear surface BS of the window W. For example, the holes MH in the third hole H3 are closed by the first cap portion CP1. Since the first and second holes H1 and H2 and the holes MH are closed, contamination materials are prevented from entering the first and second holes H1 and H2 and the holes MH. Thus, when the window WM and the display panel are assembled, the display panel is prevented from being contaminated by contamination materials in the first and second holes H1 and H2 and the holes MH.

According to some embodiments, the window WM is transported into a chamber for the assembling process, the front protection film FPF, the first and second protection films PF1 and PF2, and the cap CP of the window WM are removed, and then, the window W is assembled with the display panel.

In a window WM according to some embodiments of the inventive concept, the protection films FPF, PF1, and PF2 and the cap CP close the first and second, holes H1 and H2 and the holes and it is possible to prevent contamination materials from entering the first and second holes H1 and H2 and the holes MH.

FIGS. 7 to 12 illustrate cap members according to some embodiments of the inventive concept.

Hereinafter, cap members CP_1-CP_5 according to some embodiments of the inventive concept will be described with reference to FIGS. 7 to 12. In the following description of FIGS. 7 to 12, for the sake of brevity, an element described with reference to FIG. 5 may be identified by the same reference number without repeating a description thereof.

Figure 7:
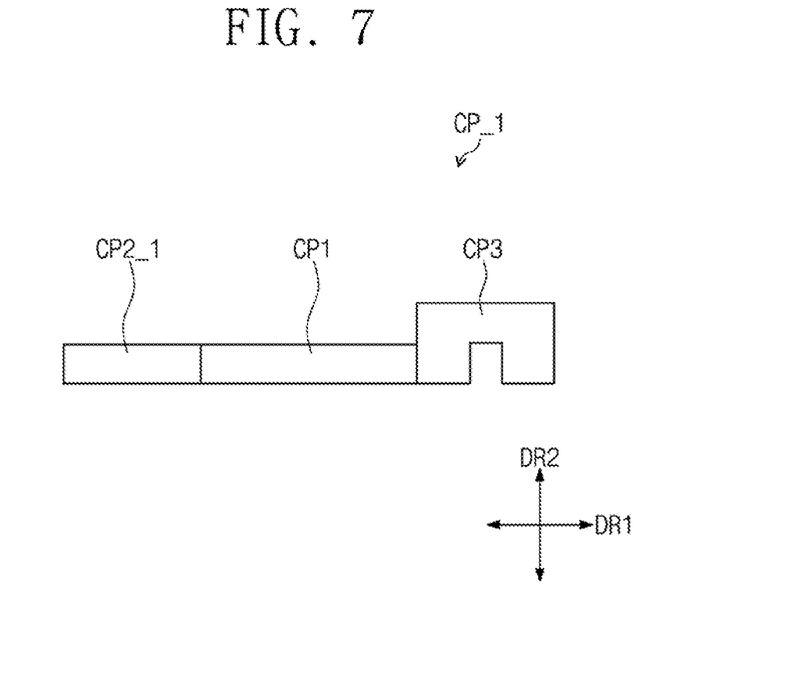
FIGS. 7 to 12 illustrate cap members according to some embodiments of the inventive concept.
Figure 8:
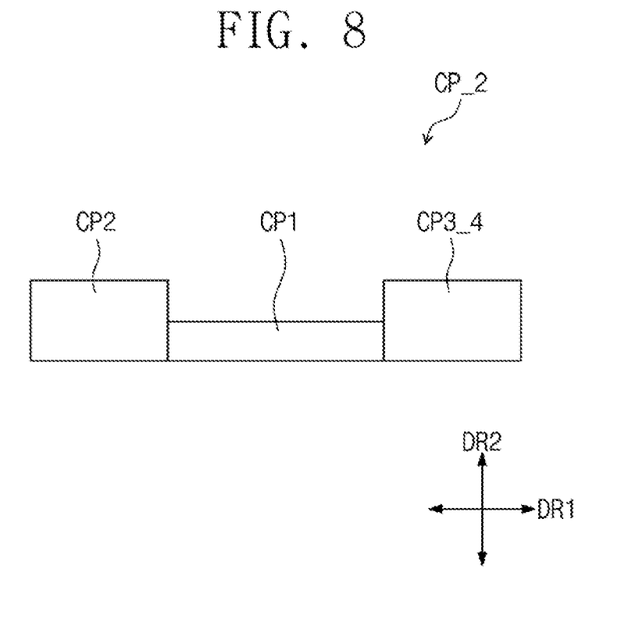
Figure 9:
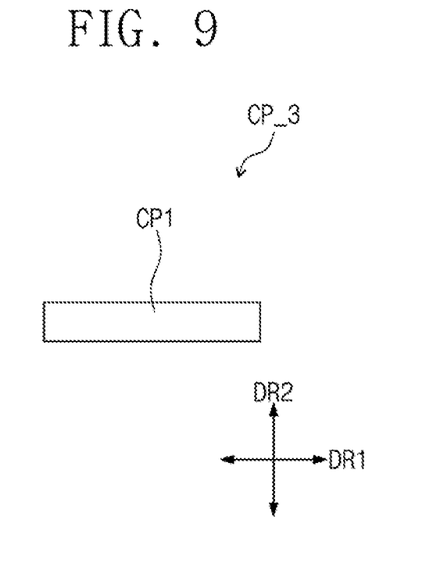
Figure 10:
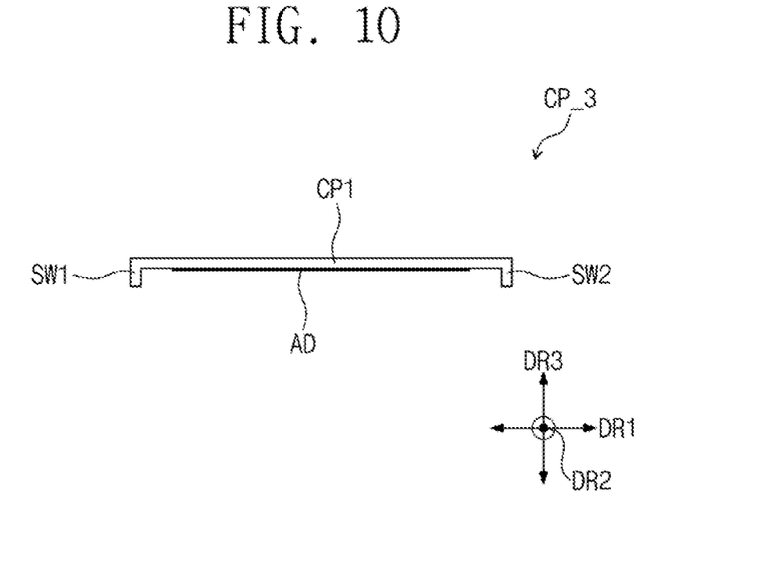
Figure 11:
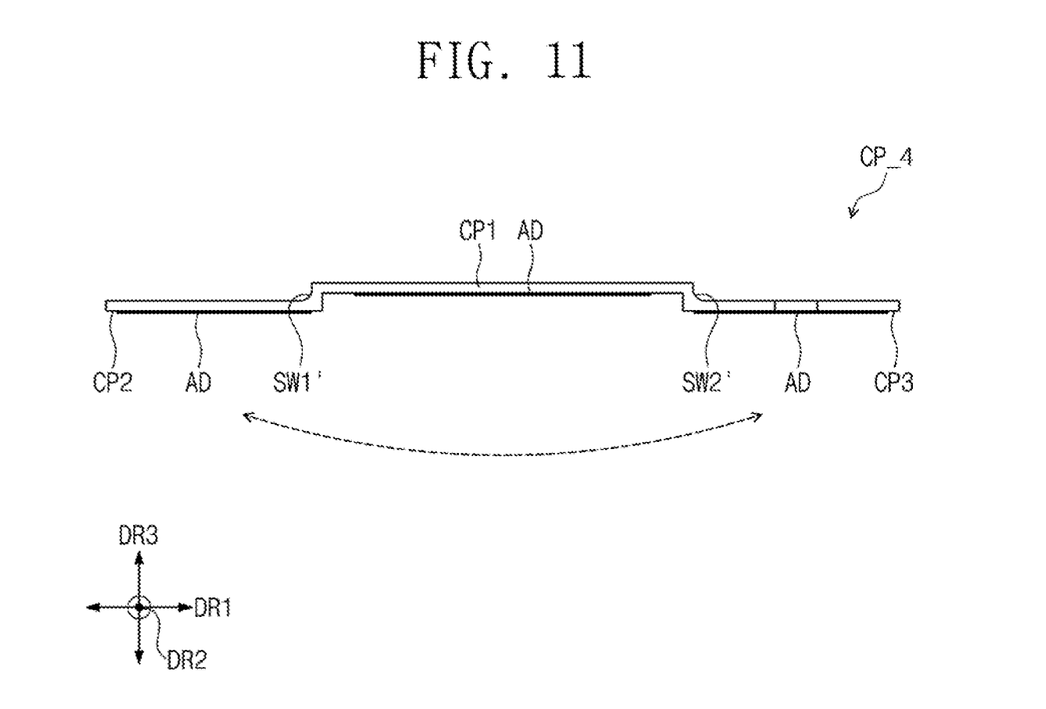
Figure 12:
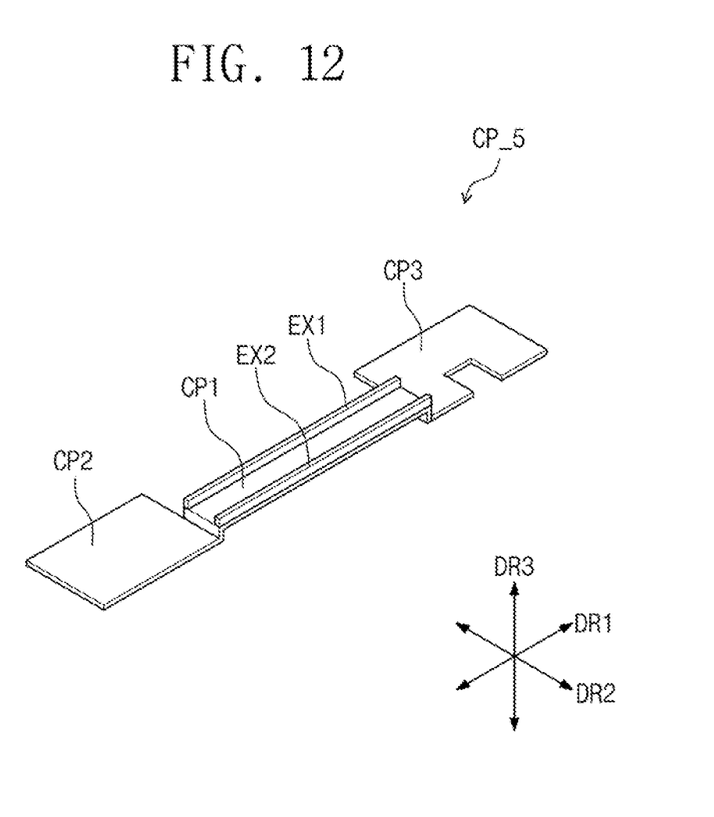

For example, FIGS. 7, 8, and 9 are plan views of cap members CP_1, CP_2, and CP_3, respectively, and FIG. 10 is a side view of cap member CP_3. In detail, FIG. 10 illustrates an enlarged vertical section of the cap CP_3 of FIG. 9. FIG. 11 is a side view of the cap CP_4, and FIG. 12 is a perspective view of the cap CP_5.

Referring to FIG. 7, according to some embodiments, the cap CP_1 includes the first cap portion CP1, a second cap portion CP2_1, and the third cap portion CP3. The first cap portion CP1 and the third cap portion CP3 have substantially the same features as the first cap portion CP1 and third cap portion CP3 described with reference to FIGS. 5 and 6. The second cap portion CP2_1 extend in the first direction DR1, and when measured in the second direction DR2, a width of the second cap portion CP2_1 is substantially equal to a width of the first cap portion CP1.

Referring to FIG. 8, according to some embodiments, the cap CP_2 includes the first cap portion CP1, the second cap portion CP2, and a third cap portion CP3_4. The first cap portion CP1 and the second cap portion CP2 have substantially the same features as the first cap portion CP1 and the second cap portion CP2 described with reference to FIGS. 5 and 6.

According to some embodiments, when measured in the second direction DR2, a width of the third cap portion CP3_4 is greater than that of the first cap portion CP1, and the third cap portion CP3_4 has substantially the same size, such as area or width, as the second cap portion CP2. The cap CP_2 of FIG. 8 can be used in the window WM when no QR code is provided between the first sub hole H2_1 and the second sub-hole H2_2.

According to some embodiments, the first sidewall portion SW1 and the second sidewall portion SW2 are not illustrated in the plan views of FIGS. 7 and 8 that illustrate the caps CP_1 and CP_2 but the caps CP_1 and CP_2 include the first sidewall portion SW1 and the second sidewall portion SW2, similar to the cap CP of FIG. 6.

Referring to FIGS. 9 and 10, according to some embodiments, the cap CP_3 includes the first cap portion CP1, the first sidewall portion SW1 that extends from an end of the first cap portion CP1 in the third direction DR3 and the second sidewall portion SW2 that extends from an opposite end of the first cap portion CP1 in the third direction DR3.

According to some embodiments, the second and third cap portions CP2 and CP3 shown in FIG. 5 are not included in the cap CP_3. For example, as shown in FIG. 10, the cap CP_3 includes the first cap portion CP1, the first sidewall portion SW1, and the second sidewall portion SW2 of FIG. 5. In this case, the cap CP_3 is locally disposed on the cover MHM to cover the holes MH.

Referring to FIG. 11, according to some embodiments, an outer side surface of a first sidewall portion SW1' and an outer side surface of a second sidewall portion SW2' of the cap CP_4 have a rounded shape. Except for this, other elements of the cap CP_4 have substantially the same features as the cap CP described with reference to FIGS. 5 and 6.

According to some embodiments an inner side surface of the first sidewall portion SW1' and an inner side surface of the second sidewall portion SW2' face each other. The outer side surface of the first sidewall portion SW1' is opposite to the inner side surface of the first sidewall portion SW1', and the outer side surface of the second sidewall portion SW2' is opposite to the inner side surface of the second sidewall portion SW2'.

As shown in FIG. 6, according to some embodiments, each of connection portions between the first sidewall portion SW1 and the second cap portion CP2, and between the second sidewall portion SW2 and the third cap portion CP3, have a step structure. In the case where, as shown in FIG. 11, the outer side surface of the first sidewall portion SW1' and the outer side surface of the second sidewall portion SW2' are rounded, connection portions between the first sidewall portion SW1' and the second cap portion CP2 and between the second sidewall portion SW2' and the third cap portion CP3 are thicker than with the step structure shown in FIG. 6.

In this case, according to some embodiments, even if an external force is exerted on the cap CP_4 as depicted by the dotted line of FIG. 11, the cap CP_4 is strong enough to resist the external force. Thus, the cap CP_4 is not deformed by the external force.

Referring to FIG. 12, according to some embodiments, the cap CP_5 further includes a first extended portion EX1 and a second extended portion EX2 disposed on the first cap portion CP1. The first and second extended portions EX1 and EX2 extend in the first direction DR1 and are spaced apart from each other in the second direction DR2. Except for the presence of the first and second extended portions EX1 and EX2, the cap CP_5 has substantially the same features as the cap CP of FIGS. 5 and 6.

According to some embodiments, the first cap portion CP1 has a rectangular shape whose long sides are parallel to the first direction DR1 and whose short sides are parallel to the second direction DR2, and the first and second extended portions EX1 and EX2 are provided on the long sides of the first cap portion CP1. In this case, even if an external force is exerted on the cap CP_5 as depicted by the dotted line of FIG. 11, the first cap portion CP1 is strong enough to resist the external force. Thus, the first cap portion CP1 is not deformed by the external force.

According to some embodiments, the cap CP_5 of FIG. 12 has substantially the same features as those of the first and second sidewall portions SW1' and SW2' of FIG. 11, described above, the first, second, and third cap portions CP1, CP2, and CP3 extends from each other by the first and second sidewall portions SW1 and SW2, but embodiments of the inventive concept are not limited thereto. For example, the first, second, and third cap portions CP1, CP2, and CP3 do not extend from each other by the first and second sidewall portions SW1 and SW2. That is, the first, second, and third cap portions CP1, CP2, and CP3 can be separated from each other.

In a window according to some embodiments of the inventive concept, protection films and a cap are used to close not only holes that expose a sensor and a camera but also holes that expose a speaker, and thus, it is possible to prevent contamination materials from entering the holes and the holes.

While exemplary embodiments of the inventive concepts, have been particularly shown and described, it will be understood by one of ordinary skill in the art that variations in form and detail may be made therein without departing from the spirit and scope of the attached claims.

What is claimed is:

1. A window assembly, comprising:
    a window that includes a first hole, a second hole, and a third hole between the first and second holes, wherein the window comprises a display region and a non-display region that surrounds the display region;
    a front protection film disposed on a front surface of the window that covers the first, second, and third holes;
    a first protection film disposed on a rear surface of the window that covers the first hole;
    a second protection film disposed on the rear surface of the window that covers the second hole;
    a cover disposed on the rear surface of the window and inserted into the third hole, the cover including a plurality of holes; and
    a cap disposed on the rear surface of the non-display, region of the window but not the display region and on the first and second protection films and the cover.

2. The window assembly of claim 1, wherein the cap comprises:
    a first cap portion that covers the cover;
    a second cap portion extending from an end of the first cap portion and that covers the first protection film; and
    a third cap portion extending from an opposite end of the first cap portion and that covers the second protection film.

3. The window assembly of claim 2, wherein the cap further comprises:

a first sidewall portion that extends from the end of the first cap portion to an end of the second cap portion that is adjacent to the end of the first cap portion; and a second sidewall portion that extends from the opposite end of the first cap portion to an end of the third cap portion that is adjacent to the opposite end of the first cap portion, wherein the first and second sidewall portions extend from the first cap portion toward the rear surface of the window in a direction normal to a flat surface of the window.

4. The window assembly of claim 3, wherein an outer side surface of the first sidewall portion and an outer side surface of the second sidewall portion have a rounded shape, an inner side surface of the first sidewall portion and an inner side surface of the second sidewall portion are opposite to each other, the outer side surface of the first sidewall portion is opposite to the inner side wake of the first sidewall portion, and the outer side surface of the second sidewall portion is opposite to the inner side surface of the second sidewall portion.

5. The window assembly of claim 2, wherein the first cap portion is higher with respect to the rear surface of the window than the second and third cap portions, the second cap portion is disposed coplanar with the third cap portion, and thicknesses of the first, second, and third cap portions are equal to each other.

6. The window assembly of claim 5, wherein a difference in height between a top surface of the first cap portion and a top surface of each of the second and third cap portions ranges from 0.45 mm to 0.6 mm.

7. The window assembly of claim 2, further comprising an adhesive member disposed below each of the first, second, and third cap portions.

8. The window assembly of claim 7, wherein the adhesive member comprises:

a base substrate;

a first sub-adhesive portion disposed on the base substrate; and a second sub-adhesive portion disposed below the base substrate, wherein the first sub-adhesive portion is attached to a bottom surface of each of the first, second, and third cap portions, and an adhesive strength of the first sub-adhesive portion is greater than that of the second sub-adhesive portion.

9. The window assembly of claim 2, wherein the cover comprises:

a first cover inserted into the third hole, the holes being provided in the first cover; and a second cover extending from the first cover and disposed on the rear surface of the window adjacent to the third hole.

10. The window assembly of claim 9, wherein the first cover comprises:

a flat first sub-cover, the holes being provided in first sub-cover; and a second sub-cover extending from an end of the first sub-cover that extends in a direction normal to the rear surface of the window, and is disposed on an inner side surface of the third hole, wherein the second cover extends from a top, portion of the second sub-cover.

11. The window assembly of claim 10, further comprising a strengthening, portion disposed on a side surface of the second sub-cover and a top surface of the second cover, wherein the first cap portion is disposed on the first sub-cover and the strengthening portion and covers the holes.

12. The window assembly of claim 2, wherein the first, second, and third holes are provided on the non-display region and are spaced apart in a first direction.

13. The window assembly of claim 12, wherein the third cap portion comprises:

a first sub-cap portion and a second sub-cap portion spaced apart from each other in the first direction and that extend in a second direction crossing the first direction; and a third sub-cap portion extending from top portions of the first and second sub-cap portions and that extends in the first direction.

14. The window assembly of claim 13, wherein the second hole comprises a first sub-hole and a second sub-hole spaced apart in the first direction, the first sub-cap portion overlaps the first sub-hole, and the second sub-cap portion overlaps the second sub-hole.

15. The window assembly of claim 13, wherein the first cap portion extends in the first direction, and a width of the second cap portion is greater than a width of the first cap portion when measured in the second direction.

16. The window assembly of claim 13, wherein the first cap portion and the second cap portion extend in the first direction, and a width of the first cap portion is substantially equal to a width of the second cap portion when measured in the second direction.

17. The window assembly of claim 12, wherein the first cap portion extends in the first direction, and a width of each of the second and third cap portions is greater than a width of the first cap portion when measured in a second direction crossing the first direction.

18. The window assembly of claim 12, further comprising a first extended portion and a second extended portion disposed on the first cap portion and that extend in the first direction and are spaced apart from each other in a second direction crossing the first direction, wherein the first cap portion has a rectangular shape whose long sides are parallel to the first direction and whose short sides are parallel to the second direction, and the first and second extended portions are disposed on the long sides, respectively, of the first cap portion.

19. A window assembly, comprising:

a window that includes a first hole, a second hole, and a third hole between the first and second holes;

a front protection film disposed on a front surface of the window;

a first protection film disposed on a rear surface of the window that covers the first hole;

a second protection film disposed on the rear surface of the window that covers the second hole;

a cover disposed on the rear surface of the window and inserted into the third hole, the cover including a plurality of holes;

a first cap portion disposed on the rear surface of the window and on the cover;

a first sidewall portion extending from an end of the first cap portion and in a direction normal to a flat surface of the window; and a second sidewall portion extending from an opposite end of the first cap portion and that extends parallel to the first sidewall portion, wherein the first sidewall portion and the second sidewall portion extend from the first cap portion toward the rear surface of the window.

20. A window assembly, comprising:

a window that includes a first hole, a second hole, and a third hole between the first and second holes;

a front protection film disposed on a front surface of the window;

a first protection film disposed on a rear surface of the window that covers the first hole;

a second protection film disposed on the rear surface of the window that covers the second hole;

a cover disposed on the rear surface of the window and inserted into the third hole, the cover including a plurality of holes, wherein the cover includes a first cover inserted into the third hole, the holes being provided in the first cover, and a second cover extending from the first cover and disposed on the rear surface of the window adjacent to the third hole; and a first cap portion disposed on the rear surface of the window and on the cover, wherein the first hole is closed by the front protection film and the first protection film, the second hole is closed by the front protection film and the second protection film, and the holes are closed by the front protection film and the first cap portion.

21. The window assembly of claim 20, further comprising:

a second cap portion extending from n end of the first cap portion and disposed on the first protection film; and a third cap portion extending from an opposite end of the first cap portion and disposed on the second protection film.

* * * * *